May 5, 1959 A. C. BLANEY 2,885,491

CONSTANT WAVELENGTH CONTROL TONE SYSTEM

Filed Aug. 1, 1955

INVENTOR.
ARTHUR C. BLANEY
BY [signature]
ATTORNEY

United States Patent Office 2,885,491

Patented May 5, 1959

2,885,491

CONSTANT WAVELENGTH CONTROL TONE SYSTEM

Arthur C. Blaney, Tarzana, Calif., assignor to Radio Corporation of America, a corporation of Delaware Application August 1, 1955, Serial No. 525,555

7 Claims. (Cl. 179—100.3)

This invention relates to signal generators and the recording of the signals generated on a medium which varies in speed, the signal record having a constant wavelength regardless of the speed of the medium during recording.

Systems for recording a control tone to provide a memory device have been suggested. In many of these systems, a tone of a certain frequency is recorded as a means for obtaining a permanent record of a change that was made in the system. Systems using such records may be multiple motion picture film editors, as disclosed and claimed in co-pending application, Ser. No. 520,193, filed July 6, 1955, assigned to the same assignee as the present application. In these particular systems, different changes may be represented by different frequencies or the changes may be represented by a change in amplitude of a certain frequency. They also could be represented by the location of the recorded tone on the record medium.

When the record medium is run at a constant speed during recording, the control tone may be supplied from a fixed frequency oscillator, and the desired results obtained by well known and established methods currently practiced. However, if the device and the memory medium are operated over a wide range of speed, the recording of a constant frequency tone from an oscillator becomes very difficult from the standpoint of the performance of the over-all system. For instance, if a constant frequency of 1000 cycles is used and the record medium is run at a speed of 18 inches per second, the wavelength becomes 18 mils. If the speed is reduced to one inch per second, the recording wavelength becomes 1.8 mils. Thus, the wavelength is directly proportional to the speed.

Now, when a control or memory record as just mentioned is reproduced, its frequency will depend upon the speed at which it was recorded and also the speed at which it is reproduced. If the speed of recording varies over a range of 20 to 1, and this record is reproduced at a constant speed, then the reproduced frequency will vary 20 to 1. The system is further complicated, however, if the speed of the memory medium is also varied during reproduction. While such a system could be used, it would require amplifiers and a transmission system having a pass band of an extremely wide frequency range.

To eliminate these disadvantages, the present invention records a memory signal or control tone with a constant wavelength regardless of the speed of the medium during recording. This is accomplished by having the speed of the memory medium control the frequency of the tone during recording. Now if the memory medium is reproduced at a constant speed, the frequency of the tone is constant, or if it is reproduced at a variable speed, the frequency varies with the reproducing speed.

To provide a constant frequency or wavelength record, either magnetic or optical, at varying speeds of the record medium, the medium may be connected to the device being operated so that the frequency of the tone generated is in direct proportion to the speed of the device. If the device is handling motion picture film and the recording medium is a roll of film having a magnetic coating with the standard sprocket holes, then the sprocket holes are used to modulate the light beam, which in turn can be amplified and used as the memory signal for recording. If the light beam is in the form of a single spot, then the wavelength will correspond to the pitch of the sprocket holes. This presents two limitations. First, the definition of the memory system is limited to one sprocket hole pitch. Second, the lowest frequency of the memory tone during reproduction is determined by the speed of the film during reproduction, and if this is as low as one inch per second, then the frequency is approximately five cycles per second, which is difficult to transmit through a standard audio amplifier. From a practical standpont, therefore, it is desirable to record more than one cycle per sprocket hole pitch. The present invention accomplishes this result by using an optical system which scans the sprocket holes to obtain the memory tones, but instead of using one spot of light, several spots are used. The following system to be described uses six spots or slits of light to scan the sprocket holes which provides a wavelength for the memory tone as recorded on the film of ⅙ of the sprocket hole pitch.

The principal object of the invention, therefore, is to facilitate the recording of a practical constant frequency or wavelength tone on a record medium driven at varying speeds.

Another object of the invention is to provide an improved system for generating a signal having a constant wavelength at different speeds of the recording medium.

A further object of the invention is to provide an improved optical signal generator which will provide a recorded signal of constant wavelength at different recording speeds of the recording medium.

The novel features which are believed to be characteristic of this invention, both as to the manner of its organization and the mode of its operation, will be better understood from the following description when read in conjunction with the accompanying drawings, in which.

Figures 1, 2:
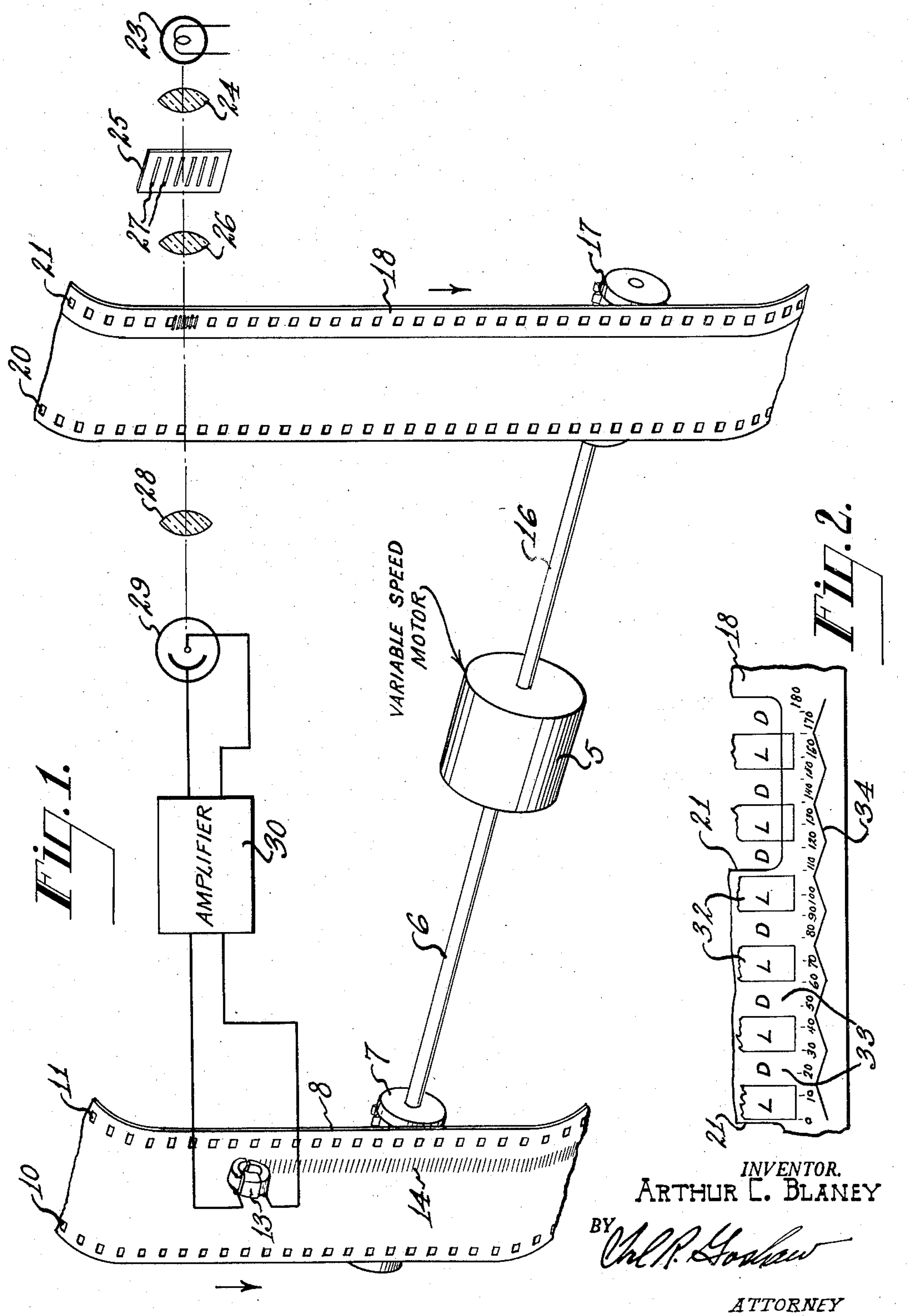
Fig. 1 is a diagrammatic view of a system embodying the invention.
Fig. 2 is an enlarged detail view showing the relationship between the sprocket holes and light beams.

Referring now to the drawings, a variable speed motor 5 is connected by a shaft 6 to a sprocket 7 advancing a magnetic record medium 8 in the direction shown by the arrow. The record medium may be a standard 35 mm. magnetic film having sprocket hole rows 10 and 11. In contact with the film is shown a magnetic head 13 which produces a magnetic track 14.

The variable speed motor 5 is also connected by shaft 16 to a sprocket 17 advancing a film 18 in the direction shown by the arrow, film 18 having rows of sprocket holes 20 and 21 with opaque lands therebetween. Light from a light source 23 is projected by a lens 24 on a slit plate 25, the emerging light being projected by a lens 26 on the row of sprocket holes 21, the light emerging through the sprocket holes being collected by a lens 28 and projected on a photoelectric cell 29. The cell 29 is connected to an amplifier 30 which feeds the magnetic recording head 13.

As mentioned above, the slit plate 25 has six slits 27 therein which are related to the sprocket holes, as shown in Fig. 2. The widths of the light images 32 and the spaces 33 therebetween are substantially equal. With this arrangement of light slit spacing, so that in one position four light slit images are on the opaque lands between the sprocket holes and two images are across the sprocket holes, the wavelength of the memory tone as recorded is ⅙ of the sprocket hole pitch. Only 33⅓ percent of the light is modulated and only one tone is reproduced, as illustrated by the line 34. Since the film 18 is advanced at exactly the same rate as the film 8 on which the memory tone is recorded, then the wavelength of the tone record 14 will be constant at all times, as shown at 34, and when reproduced at a constant speed will provide a constant frequency and the necessary signal strength to operate relays and other similar units.

Although the above arrangement produces a single tone, if only two of the light slits were used, a frequency having a wavelength of ⅙ of a sprocket hole pitch would still be produced along with a lower frequency, since at certain times both of the light slits would be shining through the sprocket holes, while in another instance both of them would be masked off by the land between the sprocket holes. The generation of two control tones at different frequencies is desirable where two differently tuned relays are to be operated from the same control record. Six light slits or images spaced as illustrated have been described, but it is to be understood that different numbers of slits and images with different spacings may be used to obtain records of different constant wavelengths. Furthermore, films of different widths with and without sprocket holes may be used. The spacing and width of the light images will vary with the spacing of the sprocket holes, while films without sprocket holes may be provided with reflective spots.

Although the invention has been illustrated as using a second film 18, similar to film 8, to generate the control tone, it is to be understood that the optical system may function with the film 8 on which the signal is being recorded. Thus, the generated signal will be derived from the same film on which the signal is being recorded with the same result as described above.

I claim:

1. A system for generating a signal to be recorded with a constant wavelength on a record medium adapted to vary in speed comprising means for generating electrical currents varying in frequency in accordance with the speed of said record medium, and means for recording said currents as a constant wavelength record on said record medium as it varies in speed, said medium being a film having rows of sprocket holes, and said electrical current producing means including a light source, a slit plate for producing a plurality of light beams, means for projecting said beams on a row of sprocket holes of said medium, and means for translating said light beams into electrical currents.

2. A system for generating a signal to be recorded with a constant wavelength on a record medium adapted to vary in speed comprising means for generating electrical currents varying in frequency in accordance with the speed of said record medium, and means for recording said currents as a constant wavelength record on said record medium as it varies in speed, said medium being a film having at least one row of sprocket holes, and said electrical current producing means including a light source, a slit plate for producing a plurality of light beams from light from said source, means for projecting said beams on said row of sprocket holes of said medium, and means for translating said beams into electrical currents.

3. A system in accordance with claim 2 in which said beams are equally spaced from one another and are of a width substantially that of the spaces between said beams.

4. A system for generating a signal to be recorded with a constant wavelength on a record medium adapted to vary in speed comprising means for generating electrical currents varying in frequency in accordance with the speed of said record medium, means for recording said currents as a constant wavelength record on said record medium as it varies in speed, said medium being a film having at least one row of sprocket holes, and said electrical current producing means including a light source, a slit plate for producing a plurality of light beams from light from said source, means for projecting said beams on said row of sprocket holes of said medium, and means for translating said beams into electrical currents, said beams being equally spaced from one another and of a width substantially that of the spaces between said beams, six of said beams being equally spaced within one sprocket hole pitch.

5. A system for obtaining a control signal record from a device operating at varying speeds comprising means for generating a plurality of light beams, means for generating a signal from said plurality of light beams having a frequency proportional to the speed of said device, and means for recording said signal on a medium having the same simultaneous speed variations to provide a reproducible signal of constant frequency when said medium is advanced at constant speed.

6. A system in accordance with claim 3 in which said generation of said signal is with said medium.

7. A system in accordance with claim 3 in which said generation of said signal is with a separate and different medium from said medium having said signal recorded thereon.

References Cited in the file of this patent

UNITED STATES PATENTS

| | | |
|---|---|---|
| 1,860,502 | Hausen | May 31, 1932 |
| 2,000,198 | Smythe | May 7, 1935 |
| 2,334,510 | Roberts | Nov. 16, 1943 |
| 2,485,839 | O'Sea | Oct. 25, 1949 |
| 2,717,283 | Friess | Sept. 6, 1955 |